(12) United States Patent
Kim et al.

(10) Patent No.: US 10,184,546 B2
(45) Date of Patent: Jan. 22, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 118 days.

(21) Appl. No.: 15/609,657

(22) Filed: May 31, 2017

(65) Prior Publication Data

US 2018/0328469 A1    Nov. 15, 2018

(30) Foreign Application Priority Data

May 10, 2017    (KR) .................. 10-2017-0058311

(51) Int. Cl.
*F16H 3/66* (2006.01)
*F16H 59/14* (2006.01)

(52) U.S. Cl.
CPC ............ *F16H 3/663* (2013.01); *F16H 59/14* (2013.01); *F16H 2200/0069* (2013.01); *F16H 2200/2015* (2013.01); *F16H 2200/2046* (2013.01)

(58) Field of Classification Search
CPC ...... F16H 3/62; F16H 3/64; F16H 2200/0069; F16H 2200/2015; F16H 2200/2046
See application file for complete search history.

(56) References Cited

U.S. PATENT DOCUMENTS

| | | | | |
|---|---|---|---|---|
| 3,433,094 | A * | 3/1969 | Phillips | F16H 3/66 475/276 |
| 5,954,608 | A * | 9/1999 | Kirkwood | F16H 3/66 475/116 |
| 9,163,705 | B1 * | 10/2015 | Hwang | F16H 3/666 |
| 9,394,975 | B1 * | 7/2016 | Calvert | B60K 6/365 |

FOREIGN PATENT DOCUMENTS

| | | | | |
|---|---|---|---|---|
| WO | WO-2011026833 A1 * | 3/2011 | | F16H 3/66 |
| WO | WO-2015024719 A1 * | 2/2015 | | F16H 3/66 |

\* cited by examiner

*Primary Examiner* — Dean A Reichard
*Assistant Examiner* — Murad Jahmani
(74) *Attorney, Agent, or Firm* — Brinks Gilson & Lione

(57) ABSTRACT

A planetary gear train of an automatic transmission for a vehicle is disclosed. The planetary gear train may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements. The planetary gear train improves power delivery performance and fuel economy by achieving ten forward speed stages and one reverse speed stage.

23 Claims, 3 Drawing Sheets

FIG. 2

| Speed stages | Engaging elements ||||||| Gear ratio | Step ratio | Note |
|---|---|---|---|---|---|---|---|---|---|
| | C1 | C2 | C3 | B1 | B2 | B3 | | | |
| D1 | ● | | | | ● | ● | 5.483 | - | |
| D2 | | | ● | | ● | ● | 3.585 | 1.529 | |
| D3 | | | ● | ● | | ● | 2.646 | 1.355 | |
| D4 | ● | | ● | | | ● | 1.865 | 1.419 | |
| D5 | | ● | ● | | | ● | 1.509 | 1.236 | Gear ratio span : 9.2 |
| D6 | ● | ● | | | | ● | 1.285 | 1.174 | |
| D7 | ● | ● | ● | | | | 1.000 | 1.285 | |
| D8 | | ● | | ● | | | 0.834 | 1.199 | ratio of R/D1 : 0.79 |
| D9 | | ● | ● | ● | | | 0.703 | 1.186 | |
| D10 | | ● | ● | | ● | | 0.593 | 1.185 | |
| REV | | ● | | | ● | ● | -4.342 | - | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0058311, filed on May 10, 2017, which is incorporated herein by reference in its entirety.

FIELD

The present disclosure relates to an automatic transmission for a vehicle. More particularly, the present disclosure relates to a planetary gear train of an automatic transmission for a vehicle that improves power delivery performance and fuel economy

BACKGROUND

The statements in this section merely provide background information related to the present disclosure and may not constitute prior art.

Generally, an automatic transmission achieving more speed stages has been developed to enhance fuel economy and improve drivability.

Such an automatic transmission achieving more speed stages allows to improve power performance and driving efficiency when downsizing an engine. Providing high efficiency multiple-speeds transmissions with smooth step ratios that can be used as an index closely related to drivability such as acceleration before and after a shift increases competitiveness of an automatic transmission in the automotive field.

However, in the automatic transmission, as the number of speed stages increase, the number of internal components increase, and as a result, mountability, cost, weight, transmission efficiency, and the like may still deteriorate.

Accordingly, development of a planetary gear train that improves efficiency with a small number of components may be provided in order to increase a fuel efficiency enhancement effect through the multiple-speeds.

An eight-speed automatic transmission has been introduced recently and a planetary gear train for an automatic transmission enabling more speed stages has been developed.

However, since a conventional eight-speed automatic transmission has gear ratio span of 6.5-7.5 (gear ratio span is an important factor for securing linearity of step ratios), improvement of power performance and fuel economy may be minimal.

In addition, if an eight-speed automatic transmission has gear ratio span larger than 9.0, we have discovered that it is difficult to secure linearity of step ratios. Therefore, driving efficiency of an engine and drivability of a vehicle may be deteriorated, and thus, development of high efficiency automatic transmissions which achieve at least nine forward speed stages is desired.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having capable of improving power delivery performance and fuel economy by achieving ten forward speed stages and one reverse speed stage and reducing drag loss of clutches and brakes using five planetary gear sets and six engaging elements.

Another form of the present disclosure provides a planetary gear train of an automatic transmission for a vehicle having further capability of improving torque delivery efficiency and durability by using a planetary gear set of an output side in torque parallel type and reducing torque share of each planetary gear set and each engaging element.

Yet another form of the present disclosure provides a high-efficiency planetary gear train of an automatic transmission for a vehicle that increases flexibility of output gear ratios and improves linearity of step ratios by using five planetary gear sets for achieving ten forward speed stages and one reverse speed stage.

A planetary gear train of an automatic transmission for a vehicle according to an exemplary form of the present disclosure may include: an input shaft configured to receive torque of an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft directly connected with the first rotation element, the sixth rotation element, and the input shaft; a second shaft directly connected with the fourteenth rotation element and the output shaft; a third shaft directly connected with the fifth rotation element, the eighth rotation element, and the thirteenth rotation element; a fourth shaft directly connected with the eleventh rotation element and the fifteenth rotation element; a fifth shaft directly connected with the fourth rotation element; a sixth shaft directly connected with the ninth rotation element; a seventh shaft directly connected with the second rotation element; an eighth shaft directly connected with the third rotation element, the seventh rotation element, and the tenth rotation element; and a ninth shaft directly connected with the twelfth rotation element.

The planetary gear train may further include: six engaging elements configured to selectively connect one shaft of the nine shafts with another shaft of the nine shafts or selectively connect at least one shaft of the nine shafts with a transmission housing, wherein any one of forward speed stages or a reverse speed stage is achieved by operating three engaging elements among the six engaging elements.

The six engaging elements may include: three clutches configured to connect any two shafts among the nine shafts; and three brakes configured to selectively connect at least one shaft among the nine shafts that is not connected with the input shaft or the output shaft with the transmission housing.

The second planetary gear set may be locked-up by one clutch among the three clutches selectively connecting any two shafts among the first shaft, the third shaft, and the fifth shaft.

In one aspect, the six engaging elements may include: a first clutch disposed between the first shaft and the third shaft; a second clutch disposed between the fourth shaft and the sixth shaft; a third clutch disposed between the fifth shaft and the sixth shaft; a first brake disposed between the eighth shaft and the transmission housing; a second brake disposed between the seventh shaft and the transmission housing; and a third brake disposed between the ninth shaft and the transmission housing.

In another aspect, the six engaging elements may include: a first clutch disposed between the third shaft and the fifth shaft; a second clutch disposed between the fourth shaft and the sixth shaft; a third clutch disposed between the fifth shaft and the sixth shaft; a first brake disposed between the eighth shaft and the transmission housing; a second brake disposed between the seventh shaft and the transmission housing; and a third brake disposed between the ninth shaft and the transmission housing.

The first, second, and third rotational elements may be the first sun gear, the first planet carrier, and the first ring gear respectively, the fourth, fifth, and sixth rotational elements may be the second sun gear, the second planet carrier, and the second ring gear respectively, the seventh, eighth, and ninth rotational elements may be the third sun gear, the third planet carrier, and the third ring gear respectively, the tenth, eleventh, and twelfth rotational elements may be the fourth sun gear, the fourth planet carrier, and the fourth ring gear respectively, and the thirteenth, fourteenth, and fifteenth rotational elements may be the fifth sun gear, the fifth planet carrier, and the fifth ring gear respectively.

The first, second, third, fourth, and fifth planetary gear sets may be disposed in a sequence of the first, second, third, fourth, and fifth planetary gear sets from an engine side.

A planetary gear train of an automatic transmission for a vehicle according to another exemplary form of the present disclosure may include: an input shaft configured to receive torque of an engine; an output shaft configured to outputt torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft directly connected with the first rotation element, the sixth rotation element, and the input shaft; a second shaft directly connected with the fourteenth rotation element and the output shaft; a third shaft directly connected with the fifth rotation element, the eighth rotation element, and the thirteenth rotation element; a fourth shaft directly connected with the eleventh rotation element and the fifteenth rotation element; a fifth shaft directly connected with the fourth rotation element; a sixth shaft directly connected with the ninth rotation element; and a plurality of shafts selectively and respectively connected with a transmission housing while directly and respectively connected with at least one rotation element of remaining rotation elements of the first, third, and fourth planetary gear sets that are not connected to the first, second, third, fourth, or sixth shafts.

The plurality of shafts may include: a seventh shaft directly connected with the second rotation element; an eighth shaft directly connected with the third rotation element, the seventh rotation element, and the tenth rotation element; and a ninth shaft directly connected with the twelfth rotation element.

The planetary gear train may further include: three clutches each configured to connect any two shafts among the nine shafts; and three brakes each configured to selectively connect at least one shaft among the nine shafts that is not connected with the input shaft or the output shaft with the transmission housing.

The second planetary gear set may be locked-up by at least one clutch among the three clutches selectively connecting any two shafts among the first shaft, the third shaft, and fifth shaft.

In one aspect, the three clutches may include: a first clutch disposed between the first shaft and the third shaft; a second clutch disposed between the fourth shaft and the sixth shaft; and a third clutch disposed between the fifth shaft and the sixth shaft. The three brakes may include: a first brake disposed between the eighth shaft and the transmission housing; a second brake disposed between the seventh shaft and the transmission housing; and a third brake disposed between the ninth shaft and the transmission housing.

In another aspect, the three clutches may include: a first clutch disposed between the third shaft and the fifth shaft; a second clutch disposed between the fourth shaft and the sixth shaft; and a third clutch disposed between the fifth shaft and the sixth shaft. The three brakes may include: a first brake disposed between the eighth shaft and the transmission housing; a second brake disposed between the seventh shaft and the transmission housing; and a third brake disposed between the ninth shaft and the transmission housing.

The first, second, and third rotational elements may be the first sun gear, the first planet carrier, and the first ring gear respectively, the fourth, fifth, and sixth rotational elements may be the second sun gear, the second planet carrier, and the second ring gear respectively, the seventh, eighth, and ninth rotational elements may be the third sun gear, the third planet carrier, and the third ring gear respectively, the tenth, eleventh, and twelfth rotational elements may be the fourth sun gear, the fourth planet carrier, and the fourth ring gear respectively, and the thirteenth, fourteenth, and fifteenth rotational elements may be the fifth sun gear, the fifth planet carrier, and the fifth ring gear respectively.

The first, second, third, fourth, and fifth planetary gear sets may be disposed in a sequence of the first, second, third, fourth, and fifth planetary gear sets from an engine side.

A planetary gear train of an automatic transmission for a vehicle according to another exemplary form of the present disclosure may include: an input shaft configured to receive torque of an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft directly connected with the first rotation element, the sixth rotation element, and the input shaft; a second shaft directly connected with the fourteenth rotation element and the output shaft; a third shaft directly connected with the fifth rotation element, the eighth rotation element, and the thirteenth rotation element; a fourth shaft directly connected with the eleventh rotation element and the fifteenth rotation element; a fifth shaft directly connected with the fourth rotation element; a sixth shaft directly connected with the ninth rotation element; and seventh, eighth, and ninth shafts each configured to selectively connected with a transmission housing via at least one of brakes while directly connected with at least one rotation element of remaining rotation elements of the first, third, and fourth planetary gear sets that are not connected to the first, second, third, fourth, fifth, or sixth shafts.

In one aspect, the first shaft and the third shaft, the fourth shaft and the sixth shaft, and the fifth shaft and the sixth shaft may be selectively connected with each other through at least one of clutches, the seventh shaft may be directly connected with the second rotation element, the eighth shaft may be directly connected with the third rotation element, the seventh rotation element, and the tenth rotation element, and the ninth shaft may be directly connected with the twelfth rotation element.

The clutches may include: a first clutch disposed between the first shaft and the third shaft; a second clutch disposed between the fourth shaft and the sixth shaft; and a third clutch disposed between the fifth shaft and the sixth shaft. The brakes may include: a first brake disposed between the eighth shaft and the transmission housing; a second brake disposed between the seventh shaft and the transmission housing; and a third brake disposed between the ninth shaft and the transmission housing.

In another aspect, the third shaft and the fifth shaft, the fourth shaft and the sixth shaft, and the fifth shaft and the sixth shaft may be selectively connected with each other through at least one of clutches, the seventh shaft may be directly connected with the second rotation element, the eighth shaft directly may be connected with the third rotation element, the seventh rotation element, and the tenth rotation element, and the ninth shaft may be directly connected with the twelfth rotation element.

The clutches may include: a first clutch disposed between the third shaft and the fifth shaft; a second clutch disposed between the fourth shaft and the sixth shaft; and a third clutch disposed between the fifth shaft and the sixth shaft. The brakes may include: a first brake disposed between the eighth shaft and the transmission housing; a second brake disposed between the seventh shaft and the transmission housing; and a third brake disposed between the ninth shaft and the transmission housing.

The first, second, and third rotational elements may be the first sun gear, the first planet carrier, and the first ring gear respectively, the fourth, fifth, and sixth rotational elements may be the second sun gear, the second planet carrier, and the second ring gear respectively, the seventh, eighth, and ninth rotational elements may be the third sun gear, the third planet carrier, and the third ring gear respectively, the tenth, eleventh, and twelfth rotational elements may be the fourth sun gear, the fourth planet carrier, and the fourth ring gear respectively, and the thirteenth, fourteenth, and fifteenth rotational elements may be the fifth sun gear, the fifth planet carrier, and the fifth ring gear respectively.

The first, second, third, fourth, and fifth planetary gear sets may be disposed in a sequence of the first, second, third, fourth, and fifth planetary gear sets from an engine side.

According to exemplary forms of the present disclosure, ten forward speed stages and one reverse speed stage may be achieved by combining five planetary gear sets being simple planetary gear sets with six engaging elements.

In addition, since gear ratio span greater than 9.2 is secured, driving efficiency of the engine may be increased. In addition, since linearity of step ratios can be secured due to multiple speed stages, drivability such as acceleration before and after shift, rhythmical engine speed, and so on may be improved.

In addition, since ten forward speed stages and one reverse speed stages are achieved by using five planetary gear sets but the number of engaging elements is reduced, drag loss of clutches and brakes may be reduced and power delivery efficiency and fuel economy may be improved.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of engaging elements at each speed stage in the planetary gear train in a first exemplary form of the present disclosure.

Figure 1:
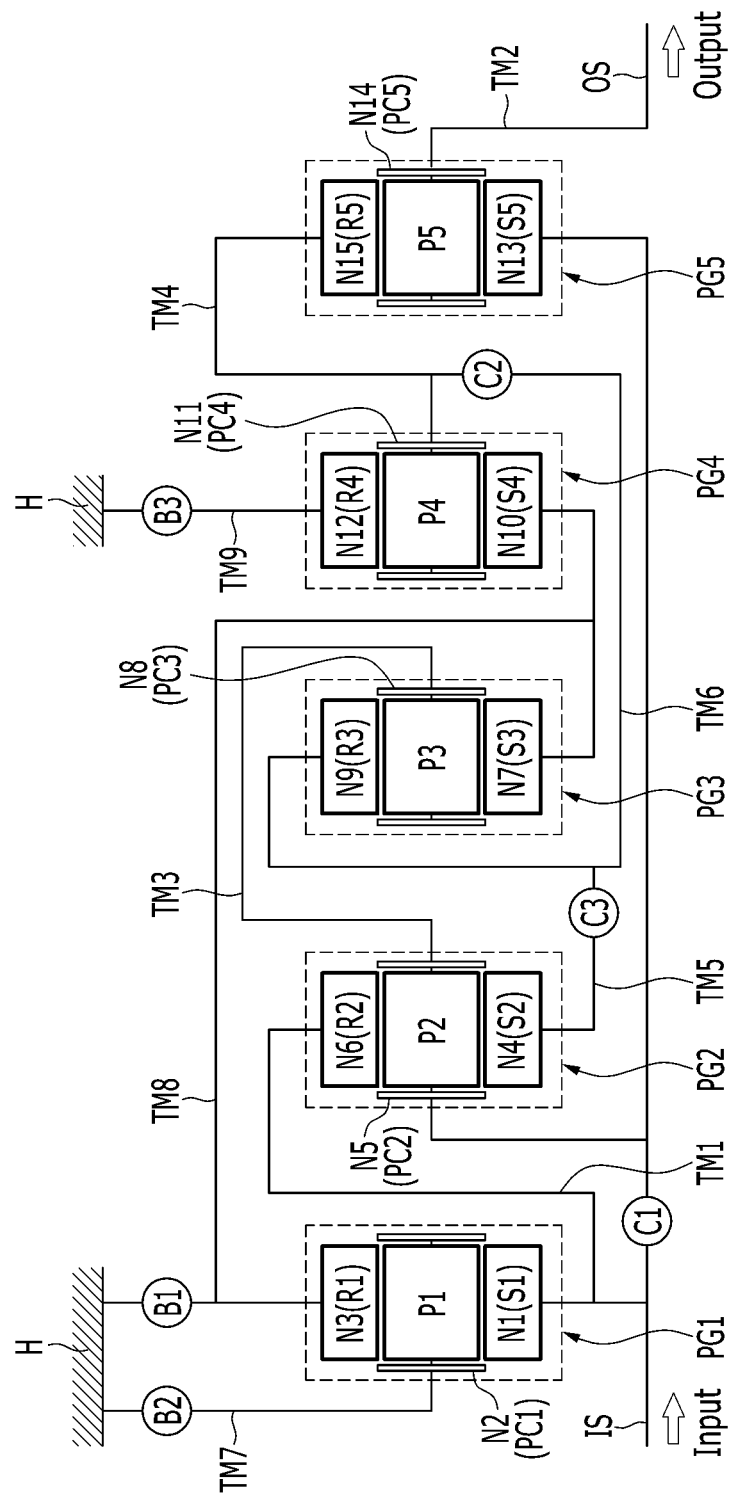
FIG. 1 is a schematic diagram of a planetary gear train in a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, parts which are not related with the description are omitted for clearly describing the exemplary forms of the present disclosure and like reference numerals refer to like or similar elements throughout the present disclosure.

In the following description, dividing names of components into first, second, and the like is to divide the names because the names of the components are the same as each other and an order thereof is not particularly limited.

FIG. 1 is a schematic diagram of a planetary gear train in a first exemplary form of the present disclosure.

Referring to FIG. 1, a planetary gear train includes: first, second, third, fourth, and fifth planetary gear sets PG1, PG2, PG3, PG4, and PG5 disposed on the same axis, an input shaft IS, an output shaft OS, nine shafts (i.e., TM1, TM2, TM3, TM4, TM5, TM6, TM7, TM8 and TM9) connected to at least one rotation element of the first, second, third, fourth, and fifth planetary gear sets PG1, PG2, PG3, PG4, and PG5, engaging elements including three clutches C1, C2, C3 and three brakes B1, B2, B3, and a transmission housing H.

Torque input from an engine to the input shaft IS is changed by cooperation of the first, second, third, fourth, and fifth planetary gear sets PG1, PG2, PG3, PG4, and PG5, and the changed torque is output through the output shaft OS.

According to the first exemplary form of the present disclosure, the planetary gear sets are disposed in a sequence of the fourth, third, first, second, and fifth planetary gear sets PG4, PG3, PG1, PG2, and PG5 from an engine side.

The input shaft IS is an input member and torque from a crankshaft of the engine is torque-converted through a torque converter to be input into the input shaft IS.

The output shaft OS is an output member, is disposed on the same axis with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a plurality of first pinion gears P1 evenly disposed on and externally engaged with an exterior circumference of the first sun gear S1, and a first ring gear R1 of a third rotation element N3 internally engaged with the plurality of first pinion gears P1 and operably connected with the first sun gear S1.

The second planetary gear set PG2 is a single pinion planetary gear set and includes a second sun gear S2 of a fourth rotation element N4, a second planet carrier PC2 of a fifth rotation element N5 rotatably supporting a plurality of second pinion gears P2 evenly disposed on and externally engaged with an exterior circumference of the second sun gear S2, and a second ring gear R2 of a sixth rotation element N6 internally engaged with the plurality of second pinion gears P2 and operably connected with the second sun gear S2.

The third planetary gear set PG3 is a single pinion planetary gear set and includes a third sun gear S3 of a seventh rotation element N7, a third planet carrier PC3 of an eighth rotation element N8 rotatably supporting a plurality of third pinion gears P3 evenly disposed on and externally engaged with an exterior circumference of the third sun gear S3, and a third ring gear R3 of a ninth rotation element N9 internally engaged with the plurality of third pinion gears P3 and operably connected with the third sun gear S3.

The fourth planetary gear set PG4 is a single pinion planetary gear set and includes a fourth sun gear S4 of a tenth rotation element N10, a fourth planet carrier PC4 of an eleventh rotation element N11 rotatably supporting a plurality of fourth pinion gears P4 evenly disposed on and externally engaged with an exterior circumference of the fourth sun gear S4, and a fourth ring gear R4 of a twelfth rotation element N12 internally engaged with the plurality of fourth pinion gears P4 and operably connected with the fourth sun gear S4.

The fifth planetary gear set PG5 is a single pinion planetary gear set and includes a fifth sun gear S5 of a thirteenth rotation element N13, a fifth planet carrier PC5 of a fourteenth rotation element N14 rotatably supporting a plurality of fifth pinion gears P5 evenly disposed on and externally engaged with an exterior circumference of the fifth sun gear S5, and a fifth ring gear R5 of a fifteenth rotation element N15 internally engaged with the plurality of fifth pinion gears P5 and operably connected with the fifth sun gear S5.

The first rotation element N1 is directly connected with the sixth rotation element N6, the third rotation element N3 is directly connected with the seventh rotation element N7 and the tenth rotation element N10, the fifth rotation element N5 is directly connected with the eighth rotation element N8 and the thirteenth rotation element N13, and the eleventh rotation element N11 is directly connected with the fifteenth rotation element N15 such that the first, second, third, fourth, and fifth planetary gear sets PG1, PG2, PG3, PG4, and PG5 include nine shafts TM1, TM2, TM3, TM4, TM5, TM6, TM7, TM8 and TM9.

The nine shafts TM1 to TM9 will be described in further detail.

The nine shafts TM1 to TM9 directly connects a plurality of rotation elements among the rotation elements of the planetary gear sets PG1, PG2, PG3, PG4, and PG5 with each other. The nine shafts are rotation members that are connected to any one rotation element and rotate with the any one rotation element to transmit torque, and that selectively connect any one rotation element with the transmission housing H, or are fixed members that directly connect any one rotation element to the transmission housing H.

The first shaft TM1 is connected with the first rotation element N1 (first sun gear S1) and the sixth rotation element N6 (second ring gear R2) and is directly connected with the input shaft IS to be always operated as an input element.

The second shaft TM2 is connected with the fourteenth rotation element N14 (fifth planet carrier PC5) and is directly connected with the output shaft OS to be always operated as an output element.

The third shaft TM3 is connected with the fifth rotation element N5 (second planet carrier PC2), the eighth rotation element N8 (third planet carrier PC3), and the thirteenth rotation element N13 (fifth sun gear S5).

The fourth shaft TM4 is connected with the eleventh rotation element N11 (fourth planet carrier PC4) and the fifteenth rotation element N15 (fifth ring gear R5).

The fifth shaft TM5 is connected with the fourth rotation element N4 (second sun gear S2).

The sixth shaft TM6 is connected with the ninth rotation element N9 (third ring gear R3).

The seventh shaft TM7 is connected with the second rotation element N2 (first planet carrier PC1).

The eighth shaft TM8 is connected with the third rotation element N3 (first ring gear R1), the seventh rotation element N7 (third sun gear S3), and the tenth rotation element N10 (fourth sun gear S4).

The ninth shaft TM9 is connected with the twelfth rotation element N12 (fourth ring gear R4).

Here, the third shaft TM3 may be selectively connected with the first shaft TM1 to be operated as a selective input element, and the fourth shaft TM4 and the fifth shaft TM5 are selectively and respectively connected with the sixth shaft TM6.

In addition, the seventh shaft TM7, the eighth shaft TM8, and the ninth shaft TM9 are selectively connected with the transmission housing H to be operated as selective fixed elements, respectively.

Three clutches C1, C2, and C3 that are engaging elements are disposed at portions at which any two shafts among the nine shafts TM1 to TM9 including the input shaft IS and the output shaft OS are selectively connected with each other.

In addition, three brakes B1, B2, and B3 that are engaging elements are disposed at portions at which any one shaft among the nine shafts TM1 to TM9 is selectively connected with the transmission housing H.

Arrangement of the six engaging elements (three clutches C1 to C3 and three brakes B1 to B3) will be described in detail.

The first clutch C1 is disposed between the first shaft TM1 and the third shaft TM3 and selectively connects the first shaft TM1 with the third shaft TM3.

The second clutch C2 is disposed between the fourth shaft TM4 and the sixth shaft TM6 and selectively connects the fourth shaft TM4 with the sixth shaft TM6.

The third clutch C3 is disposed between the fifth shaft TM5 and the sixth shaft TM6 and selectively connects the fifth shaft TM5 with the sixth shaft TM6.

The first brake B1 is disposed between the eighth shaft TM8 and the transmission housing H and selectively connects the eighth shaft TM8 with the transmission housing H to be fixed thereto.

The second brake B2 is disposed between the seventh shaft TM7 and the transmission housing H and selectively connects the seventh shaft TM7 with the transmission housing H to be fixed thereto.

The third brake B3 is disposed between the ninth shaft TM9 and the transmission housing H and selectively connects the ninth shaft TM9 with the transmission housing H to be fixed thereto.

Figure 3:
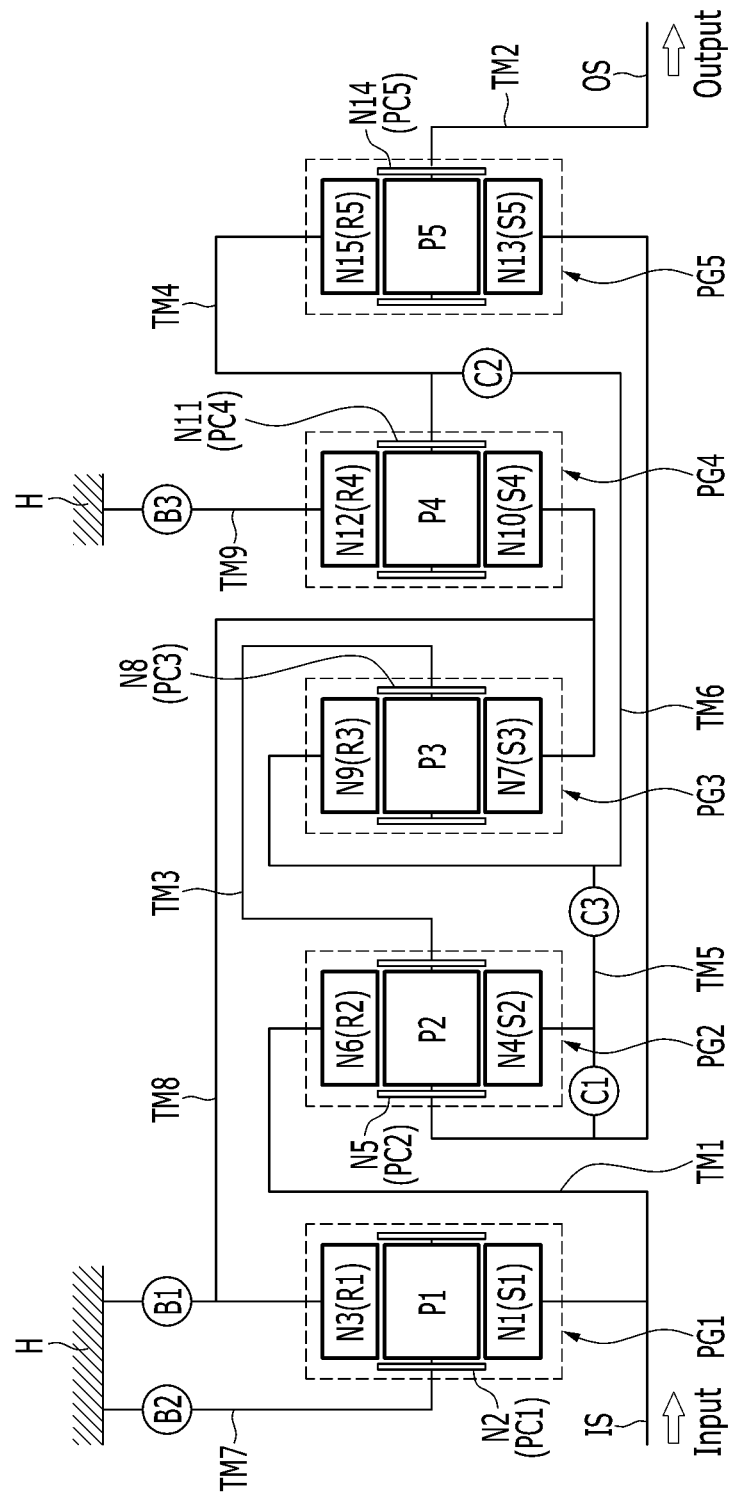
FIG. 3 is a schematic diagram of a planetary gear train in a second exemplary form of the present disclosure.

Referring to FIG. 1, the first clutch C1 is means for locking-up the second planetary gear set PG2 by selectively connecting the first shaft TM1 with the third shaft TM3. As shown in FIG. 3, the first clutch C1 may selectively connect the third shaft TM3 with the fifth shaft TM5.

The engaging elements including the first, second, and third clutches C1, C2, and C3 and the first, second, and third brakes B1, B2, and B3 may be multi-plates friction elements of wet type that are operated by hydraulic pressure. Multi-plates friction elements of wet type are mainly used as the engaging elements, but dog clutches, electric clutches, or magnetic clutches that can be operated by electric signal from an electric control unit can be used as the engaging elements.

FIG. 2 is an operation chart of engaging elements at each speed stage in the planetary gear train according to the first exemplary form of the present disclosure.

Referring to FIG. 2, three engaging elements among the first, second, and third clutches C1, C2, and C3 and the first, second, and third brakes B1, B2, and B3 are operated at each speed stage in the planetary gear train.

The first clutch C1 and the second and third brakes B2 and B3 are operated at a first forward speed stage D1.

When the first shaft TM1 is connected with the third shaft TM3 by operation of the first clutch C1, a torque of the input shaft IS is input into the first shaft TM1.

At this state, the seventh and ninth shafts TM7 and TM9 are operated as the fixed elements by operation of the second and third brakes B2 and B3. Therefore, the torque of the input shaft IS is shifted into the first forward speed stage, and the first forward speed stage is output through the output shaft OS connected with the second shaft TM2.

The third clutch C3 and the second and third brakes B2 and B3 are operated at a second forward speed stage D2.

In a state that the fifth shaft TM5 is connected with the sixth shaft TM6 by operation of the third clutch C3, the torque of the input shaft IS is input into the first shaft TM1.

At this state, the seventh and ninth shafts TM7 and TM9 are operated as the fixed elements by operation of the second and third brakes B2 and B3. Therefore, the torque of the input shaft IS is shifted into the second forward speed stage, and the second forward speed stage is output through the output shaft OS connected with the second shaft TM2.

The third clutch C3 and the first and third brakes B1 and B3 are operated at a third forward speed stage D3.

In a state that the fifth shaft TM5 is connected with the sixth shaft TM6 by operation of the third clutch C3, the torque of the input shaft IS is input into the first shaft TM1.

At this state, the eighth and ninth shafts TM8 and TM9 are operated as the fixed elements by operation of the first and third brakes B1 and B3. Therefore, the torque of the input shaft IS is shifted into the third forward speed stage, and the third forward speed stage is output through the output shaft OS connected with the second shaft TM2.

The first and third clutches C1 and C3 and the third brake B3 are operated at a fourth forward speed stage D4.

When the first shaft TM1 is connected with the third shaft TM3 by operation of the first clutch C1 and the fifth shaft TM5 is connected with the sixth shaft TM6 by operation of the third clutch C3, the torque of the input shaft IS is input into the first shaft TM1.

At this state, the ninth shaft TM9 is operated as the fixed element by operation of the third brake B3. Therefore, the torque of the input shaft IS is shifted into the fourth forward speed stage, and the fourth forward speed stage is output through the output shaft OS connected with the second shaft TM2.

The second and third clutches C2 and C3 and the third brake B3 are operated at a fifth forward speed stage D5.

In a state that the fourth shaft TM4 is connected with the sixth shaft TM6 by operation of the second clutch C2 and the fifth shaft TM5 is connected with the sixth shaft TM6 by operation of the third clutch C3, the torque of the input shaft IS is input into the first shaft TM1.

At this state, the ninth shaft TM9 is operated as the fixed element by operation of the third brake B3. Therefore, the torque of the input shaft IS is shifted into the fifth forward speed stage, and the fifth forward speed stage is output through the output shaft OS connected with the second shaft TM2.

The first and second clutches C1 and C2 and the third brake B3 are operated at a sixth forward speed stage D6.

In a state that the first shaft TM1 is connected with the third shaft TM3 by operation of the first clutch C1 and the fourth shaft TM4 is connected with the sixth shaft TM6 by operation of the second clutch C2, the torque of the input shaft IS is input into the first shaft TM1.

At this state, the ninth shaft TM9 is operated as the fixed element by operation of the third brake B3. Therefore, the torque of the input shaft IS is shifted into the sixth forward speed stage, and the sixth forward speed stage is output through the output shaft OS connected with the second shaft TM2.

The first, second, and third clutches C1, C2, and C3 are operated at a seventh forward speed stage D7.

In a state that the first shaft TM1 is connected with the third shaft TM3 by operation of the first clutch C1, the fourth shaft TM4 is connected with the sixth shaft TM6 by operation of the second clutch C2, and the fifth shaft TM5 is connected with the sixth shaft TM6 by operation of the third clutch C3, the torque of the input shaft IS is input into the first shaft TM1.

Therefore, the first, second, third, fourth, and fifth planetary gear set PG1, PG2, PG3, PG4, and PG5 become lock-up states. At this state, if the torque of the input shaft IS is input into the first shaft TM1, the torque of the input shaft IS is output through the output shaft OS connected with the second shaft TM2 without speed change.

The first and second clutches C1 and C2 and the first brake B1 are operated at an eighth forward speed stage D8.

In a state that the first shaft TM1 is connected with the third shaft TM3 by operation of the first clutch C1 and the fourth shaft TM4 is connected with the sixth shaft TM6 by operation of the second clutch C2, the torque of the input shaft IS is input into the first shaft TM1.

At this state, the eighth shaft TM8 is operated as the fixed element by operation of the first brake B1. Therefore, the torque of the input shaft IS is shifted into the eighth forward speed stage, and the eighth forward speed stage is output through the output shaft OS connected with the second shaft TM2.

The second and third clutches C2 and C3 and the first brake B1 are operated at a ninth forward speed stage D9.

In a state that the fourth shaft TM4 is connected with the sixth shaft TM6 by operation of the second clutch C2 and the fifth shaft TM5 is connected with the sixth shaft TM6 by operation of the third clutch C3, the torque of the input shaft IS is input into the first shaft TM1.

At this state, the eighth shaft TM8 is operated as the fixed element by operation of the first brake B1. Therefore, the torque of the input shaft IS is shifted into the ninth forward speed stage, and the ninth forward speed stage is output through the output shaft OS connected with the second shaft TM2.

The second and third clutches C2 and C3 and the second brake B2 are operated at a tenth forward speed stage D10.

In a state that the fourth shaft TM4 is connected with the sixth shaft TM6 by operation of the second clutch C2 and the fifth shaft TM5 is connected with the sixth shaft TM6 by operation of the third clutch C3, the torque of the input shaft IS is input into the first shaft TM1.

At this state, the seventh shaft TM7 is operated as the fixed element by operation of the second brake B2. Therefore, the torque of the input shaft IS is shifted into the tenth forward speed stage, and the tenth forward speed stage is output through the output shaft OS connected with the second shaft TM2.

The second clutch C2 and the second and third brakes B2 and B3 are operated at a reverse speed stage REV.

In a state that the fourth shaft TM4 is connected to the sixth shaft TM6 by operation of the second clutch C2, the torque of the input shaft IS is input into the first shaft TM1.

At this state, the seventh and ninth shafts TM7 and TM9 are operated at the fixed elements by operation of the second and third brakes B2 and B3. Therefore, the torque of the input shaft IS is shifted into the reverse speed stage, and the reverse speed stage is output through the output shaft OS connected with the second shaft TM2.

FIG. 3 is a schematic diagram of a planetary gear train according to the second exemplary form of the present disclosure.

Referring to FIG. 1, the first clutch C1 is disposed between the first shaft TM1 and the third shaft TM3 and selectively connects the first shaft TM1 with the third shaft TM3 in the planetary gear train according to the first exemplary form of the present disclosure, but, as shown in FIG. 3, the first clutch C1 is disposed between the third shaft TM3 and the fifth shaft TM5 and selectively connects the third shaft TM3 with the fifth shaft TM5 in the planetary gear train according to the second exemplary form of the present disclosure.

The first clutch C1 locks-up the second planetary gear set PG2 by selectively connecting any two rotation elements among the three rotation elements N4, N5, and N6 of the second planetary gear set PG2. That is, the first clutch C1 is used for locking-up the second planetary gear set PG2.

Since arrangement of the first clutch C1 according to the second form differs from that according to the first form but connections of the nine shafts TM1 to TM9, two clutches C2 and C3, and the three brakes B1 to B3 and operations and effects of the planetary gear train according to the second form are the same as those according to the first form, detailed description thereof will be omitted.

According to the first and second exemplary forms of the present disclosure, ten forward speed stages and one reverse speed stage may be achieved by using five planetary gear sets PG1, PG2, PG3, PG4, and PG5 and six engaging elements including three clutches C1, C2, and C3 and three brakes B1, B2, and B3.

In addition, since gear ratio span greater than 9.2 is secured, driving efficiency of the engine may be increased. In addition, since linearity of step ratios can be secured due to multiple speed stages, drivability such as acceleration before and after shift, rhythmical engine speed, and so on may be improved.

In addition, since ten forward speed stages and one reverse speed stages are achieved by using the reduced number of engaging elements, drag loss of clutches and brakes may be reduced and power delivery efficiency and fuel economy may be improved.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A planetary gear train of an automatic transmission for a vehicle comprising:
   an input shaft configured to receive torque of an engine;
   an output shaft configured to output torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a fifth planetary gear set including thirteenth, fourteenth, and fifteenth rotational elements;
   a first shaft directly connected with the first rotation element, the sixth rotation element, and the input shaft;
   a second shaft directly connected with the fourteenth rotation element and the output shaft;
   a third shaft directly connected with the fifth rotation element, the eighth rotation element, and the thirteenth rotation element;
   a fourth shaft directly connected with the eleventh rotation element and the fifteenth rotation element;
   a fifth shaft directly connected with the fourth rotation element;
   a sixth shaft directly connected with the ninth rotation element;
   a seventh shaft directly connected with the second rotation element;
   an eighth shaft directly connected with the third rotation element, the seventh rotation element, and the tenth rotation element; and
   a ninth shaft directly connected with the twelfth rotation element.

2. The planetary gear train of claim 1, further comprising six engaging elements configured to selectively connect one shaft of the nine shafts with another shaft of the nine shafts or selectively connect at least one shaft of the nine shafts with a transmission housing,
   wherein any one of forward speed stages or a reverse speed stage is achieved by operating three engaging elements among the six engaging elements.

3. The planetary gear train of claim 2, wherein the six engaging elements comprise:
   three clutches configured to connect any two shafts among the nine shafts; and
   three brakes configured to selectively connect at least one shaft among the nine shafts that is not connected with the input shaft or the output shaft with the transmission housing.

4. The planetary gear train of claim 3, wherein the second planetary gear set is locked-up by one clutch among the three clutches selectively connecting any two shafts among the first shaft, the third shaft, and fifth shaft.

5. The planetary gear train of claim 2, wherein the six engaging elements comprise:
   a first clutch disposed between the first shaft and the third shaft;
   a second clutch disposed between the fourth shaft and the sixth shaft;
   a third clutch disposed between the fifth shaft and the sixth shaft;
   a first brake disposed between the eighth shaft and the transmission housing;
   a second brake disposed between the seventh shaft and the transmission housing; and
   a third brake disposed between the ninth shaft and the transmission housing.

6. The planetary gear train of claim 2, wherein the six engaging elements comprise:
   a first clutch disposed between the third shaft and the fifth shaft;
   a second clutch disposed between the fourth shaft and the sixth shaft;
   a third clutch disposed between the fifth shaft and the sixth shaft;
   a first brake disposed between the eighth shaft and the transmission housing;
   a second brake disposed between the seventh shaft and the transmission housing; and
   a third brake disposed between the ninth shaft and the transmission housing.

7. The planetary gear train of claim 1, wherein the first, second, and third rotational elements are a first sun gear, a first planet carrier, and a first ring gear respectively,
   the fourth, fifth, and sixth rotational elements are a second sun gear, a second planet carrier, and a second ring gear, respectively,
   the seventh, eighth, and ninth rotational elements are a third sun gear, a third planet carrier, and a third ring gear, respectively,
   the tenth, eleventh, and twelfth rotational elements are a fourth sun gear, a fourth planet carrier, and a fourth ring gear, respectively, and
   the thirteenth, fourteenth, and fifteenth rotational elements are a fifth sun gear, a fifth planet carrier, and a fifth ring gear, respectively.

8. The planetary gear train of claim 1, wherein the first, second, third, fourth, and fifth planetary gear sets are disposed in a sequence of the first, second, third, fourth, and fifth planetary gear sets from an engine side.

9. A planetary gear train of an automatic transmission for a vehicle comprising:
   an input shaft configured to receive torque of an engine;
   an output shaft configured to output torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a fifth planetary gear set including thirteenth, fourteenth, and fifteenth rotational elements;
   a first shaft directly connected with the first rotation element, the sixth rotation element, and the input shaft;
   a second shaft directly connected with the fourteenth rotation element and the output shaft;
   a third shaft directly connected with the fifth rotation element, the eighth rotation element, and the thirteenth rotation element;
   a fourth shaft directly connected with the eleventh rotation element and the fifteenth rotation element;
   a fifth shaft directly connected with the fourth rotation element;
   a sixth shaft directly connected with the ninth rotation element; and
   a plurality of shafts selectively and respectively connected with a transmission housing while directly and respectively connected with at least one rotation element of remaining rotation elements of the first, third, and fourth planetary gear sets that are not connected to the first, second, third, fourth, fifth, or sixth shafts.

10. The planetary gear train of claim 9, wherein the plurality of shafts comprise:
    a seventh shaft directly connected with the second rotation element;
    an eighth shaft directly connected with the third rotation element, the seventh rotation element, and the tenth rotation element; and
    a ninth shaft directly connected with the twelfth rotation element.

11. The planetary gear train of claim 10, further comprising:
    three clutches each configured to connect any two shafts among the nine shafts; and
    three brakes each configured to selectively connect at least one shaft among the nine shafts that is not connected with the input shaft or the output shaft with the transmission housing.

12. The planetary gear train of claim 11, wherein the second planetary gear set is locked-up by at least one clutch among the three clutches selectively connecting any two shafts among the first shaft, the third shaft, and the fifth shaft.

13. The planetary gear train of claim 11, wherein
    the three clutches comprise:
    a first clutch disposed between the first shaft and the third shaft;
    a second clutch disposed between the fourth shaft and the sixth shaft; and
    a third clutch disposed between the fifth shaft and the sixth shaft, and
    wherein the three brakes comprise:
    a first brake disposed between the eighth shaft and the transmission housing;
    a second brake disposed between the seventh shaft and the transmission housing; and
    a third brake disposed between the ninth shaft and the transmission housing.

14. The planetary gear train of claim 11, wherein
    the three clutches comprise:
    a first clutch disposed between the third shaft and the fifth shaft;

a second clutch disposed between the fourth shaft and the sixth shaft; and a third clutch disposed between the fifth shaft and the sixth shaft, and wherein the three brakes comprise:

a first brake disposed between the eighth shaft and the transmission housing;

a second brake disposed between the seventh shaft and the transmission housing; and a third brake disposed between the ninth shaft and the transmission housing.

15. The planetary gear train of claim 9, wherein the first, second, and third rotational elements are a first sun gear, a first planet carrier, and a first ring gear respectively, the fourth, fifth, and sixth rotational elements are a second sun gear, a second planet carrier, and a second ring gear respectively, the seventh, eighth, and ninth rotational elements are a third sun gear, a third planet carrier, and a third ring gear respectively, the tenth, eleventh, and twelfth rotational elements are a fourth sun gear, a fourth planet carrier, and a fourth ring gear respectively, and the thirteenth, fourteenth, and fifteenth rotational elements are a fifth sun gear, a fifth planet carrier, and a fifth ring gear respectively.

16. The planetary gear train of claim 9, wherein the first, second, third, fourth, and fifth planetary gear sets are disposed in a sequence of the first, second, third, fourth, and fifth planetary gear sets from an engine side.

17. A planetary gear train of an automatic transmission for a vehicle comprising:

an input shaft configured to receive torque of an engine;

an output shaft configured to output torque;

a first planetary gear set including first, second, and third rotation elements;

a second planetary gear set including fourth, fifth, and sixth rotation elements;

a third planetary gear set including seventh, eighth, and ninth rotation elements;

a fourth planetary gear set including tenth, eleventh, and twelfth rotation elements;

a fifth planetary gear set including thirteenth, fourteenth, and fifteenth rotational elements;

a first shaft directly connected with the first rotation element, the sixth rotation element, and the input shaft;

a second shaft directly connected with the fourteenth rotation element and the output shaft;

a third shaft directly connected with the fifth rotation element, the eighth rotation element, and the thirteenth rotation element;

a fourth shaft directly connected with the eleventh rotation element and the fifteenth rotation element;

a fifth shaft directly connected with the fourth rotation element;

a sixth shaft directly connected with the ninth rotation element; and seventh, eighth, and ninth shafts each configured to selectively connected with a transmission housing via at least one of brakes while directly connected with at least one rotation element of remaining rotation elements of the first, third, and fourth planetary gear sets that are not connected to the first, second, third, fourth, fifth, or sixth shafts.

18. The planetary gear train of claim 17, wherein the first shaft and the third shaft, the fourth shaft and the sixth shaft, and the fifth shaft and the sixth shaft are selectively connected with each other via at least one of clutches, the seventh shaft is directly connected with the second rotation element, the eighth shaft is directly connected with the third rotation element, the seventh rotation element, and the tenth rotation element, and the ninth shaft is directly connected with the twelfth rotation element.

19. The planetary gear train of claim 18, wherein the clutches comprise:

a first clutch disposed between the first shaft and the third shaft;

a second clutch disposed between the fourth shaft and the sixth shaft; and a third clutch disposed between the fifth shaft and the sixth shaft, and wherein the brakes comprise:

a first brake disposed between the eighth shaft and the transmission housing;

a second brake disposed between the seventh shaft and the transmission housing; and a third brake disposed between the ninth shaft and the transmission housing.

20. The planetary gear train of claim 17, wherein the third shaft and the fifth shaft, the fourth shaft and the sixth shaft, and the fifth shaft and the sixth shaft are selectively connected with each other via at least one of clutches, the seventh shaft is directly connected with the second rotation element, the eighth shaft is directly connected with the third rotation element, the seventh rotation element, and the tenth rotation element, and the ninth shaft is directly connected with the twelfth rotation element.

21. The planetary gear train of claim 20, wherein the clutches comprise:

a first clutch disposed between the third shaft and the fifth shaft;

a second clutch disposed between the fourth shaft and the sixth shaft; and a third clutch disposed between the fifth shaft and the sixth shaft, and wherein the brakes comprise a first brake disposed between the eighth shaft and the transmission housing;

a second brake disposed between the seventh shaft and the transmission housing; and a third brake disposed between the ninth shaft and the transmission housing.

22. The planetary gear train of claim 17, wherein the first, second, and third rotational elements are a first sun gear, a first planet carrier, and a first ring gear, respectively, the fourth, fifth, and sixth rotational elements are a second sun gear, a second planet carrier, and a second ring gear, respectively, the seventh, eighth, and ninth rotational elements are a third sun gear, a third planet carrier, and a third ring gear, respectively, the tenth, eleventh, and twelfth rotational elements are a fourth sun gear, a fourth planet carrier, and a fourth ring gear, respectively, and the thirteenth, fourteenth, and fifteenth rotational elements are a fifth sun gear, a fifth planet carrier, and a fifth ring gear, respectively.

23. The planetary gear train of claim 17, wherein the first, second, third, fourth, and fifth planetary gear sets are disposed in a sequence of the first, second, third, fourth, and fifth planetary gear sets from an engine side.

* * * * *